US007637429B2

(12) United States Patent
Cordery et al.

(10) Patent No.: US 7,637,429 B2
(45) Date of Patent: Dec. 29, 2009

(54) ELECTRONIC VOTING SYSTEM AND ASSOCIATED METHOD

(75) Inventors: Robert A. Cordery, Danbury, CT (US); Matthew J. Campagna, Ridgefield, CT (US); Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 81 days.

(21) Appl. No.: 11/833,436

(22) Filed: Aug. 3, 2007

(65) Prior Publication Data

US 2009/0032591 A1 Feb. 5, 2009

(51) Int. Cl.
*G06K 17/00* (2006.01)
*G07C 13/00* (2006.01)

(52) U.S. Cl. ........................ 235/386; 235/51; 705/12

(58) Field of Classification Search ................ 235/386; 705/12; 713/189, 193; 380/51, 55
See application file for complete search history.

(56) References Cited

U.S. PATENT DOCUMENTS

| | | | | |
|---|---|---|---|---|
| 5,926,550 | A * | 7/1999 | Davis | 713/176 |
| 5,949,881 | A * | 9/1999 | Davis | 713/189 |
| 6,314,409 | B2 * | 11/2001 | Schneck et al. | 705/54 |
| 7,054,829 | B2 * | 5/2006 | Campo et al. | 705/12 |
| 7,077,313 | B2 * | 7/2006 | Chung et al. | 235/386 |
| 7,077,314 | B2 * | 7/2006 | Johnson | 235/386 |
| 7,092,930 | B2 | 8/2006 | Heiden et al. | |
| 7,111,782 | B2 * | 9/2006 | Homewood et al. | 235/386 |
| 7,306,148 | B1 * | 12/2007 | Morganstein | 235/386 |
| 2008/0308634 | A1 * | 12/2008 | Bolton et al. | 235/386 |

FOREIGN PATENT DOCUMENTS

EP 1783696 A1 * 5/2007

OTHER PUBLICATIONS

Mercuri, Rebecca, Facts About Voter Verified Paper Ballots, Feb. 23, 2004.

* cited by examiner

*Primary Examiner*—Michael G Lee
*Assistant Examiner*—Keith Goodman, Jr.
(74) *Attorney, Agent, or Firm*—Brian A. Lemm; Angelo N. Chaclas

(57) ABSTRACT

An electronic voting system includes a vote security device (VSD), a user interface for presenting a ballot to a voter, and an audit trail printer operatively coupled to the VSD. The printer prints an audit trail ballot only in response to verifying encrypted and/or digitally signed messages received from the VSD that indicates the voter's ballot selections. The printer is structured to allow the voter to view but not access the audit trail ballot. The voter is able to accept or reject the audit trail ballot using the user interface. If the ballot is rejected, the VSD causes the printer to print a rejection indicator on the ballot, and if the voter accepts the ballot, the VSD causes the printer to print an acceptance indicator on the ballot. A digitally signed record of the voter's ballot selections is generated and stored.

8 Claims, 4 Drawing Sheets

ELECTRONIC VOTING SYSTEM AND ASSOCIATED METHOD

FIELD OF THE INVENTION

The present invention relates to voting systems, and in particular to an electronic voting system that employs a vote security device for securing the system against tampering.

BACKGROUND OF THE INVENTION

Most conventional voting systems in place around the world utilize either paper ballots or mechanical voting booths having mechanical switches and levers that, when actuated, increment a plurality of mechanical counters. These conventional systems present a number of problems for election processes. For example, paper ballots can become physically damaged or altered between the time the voter makes his or her selection and the time a ballot-counting machine eventually reads the voter's selection on the ballot. In addition, with paper ballots, voters can inadvertently cast a vote for the wrong candidate by, for example, punching a hole or placing an X next to a different candidate than was intended. Mechanical voting booths, while solving some of the problems presented by paper ballots, present problems of their own. For instance, voting booths are fairly expensive, have many mechanical parts which require routine maintenance and repair, and are typically heavy and cumbersome to move and set up.

More recently, electronic voting systems have been developed with an eye toward solving the problems presented by systems that employ paper ballots and/or mechanical voting booths. However, none of the electronic voting systems developed to date has proven to be secure and efficient enough to result in the widespread use thereof (in place of existing paper ballot and/or mechanical voting booth systems). One main concern with electronic voting systems is that a company providing the electronic voting machines and/or those with access to the machines may illegally modify the vote counts in a manner that is difficult to notice and/or detect. Thus, there is a need for an electronic voting system that is secure against tampering in order to reduce the potential for vote counts to be surreptitiously modified.

SUMMARY OF THE INVENTION

In one embodiment, the invention provides an electronic voting system that employs a secure vote security device that has a processing unit, a key storage for storing one or more cryptographic keys, and a cryptographic engine for generating encrypted or digitally signed messages using at least one of the cryptographic keys. The system further includes a user interface for presenting a ballot to a voter and for enabling the voter to make one or more selections on the ballot, and an audit trail printer operatively coupled to the vote security device. The audit trail printer prints a paper audit trail ballot only in response to verifying one or more messages received from the vote security device. The paper audit trail ballot is based on and indicates the selections made on the ballot by the voter. In addition, the audit trail printer is structured to allow the voter to view but not physically access the paper audit trail ballot, preferably by showing the paper audit trail ballot through a window. The voter is able to accept or reject the printed paper audit trail ballot using the user interface. If the voter rejects the printed paper audit trail ballot, the vote security device causes the audit trail printer to print a rejection indicator on the printed paper audit trail ballot to create a rejected paper audit trail ballot. If the voter accepts the printed paper audit trail ballot, the vote security device causes the audit trail printer to print an acceptance indicator on the printed paper audit trail ballot to create an accepted paper audit trail ballot.

In one particular embodiment, the system further includes a vote database operatively coupled to the vote security device. The vote security device causes a vote database record to be stored in the vote database that includes at least the selections made on the ballot by the voter and an indication as to whether the voter accepted or rejected the printed paper audit trail ballot. Preferably, the vote database record is a digitally signed record generated by the vote security device using one or more cryptographic keys and the cryptographic engine.

The system may further include an audit trail scanner for generating an image of the rejected paper audit trail ballot if the voter rejects the printed paper audit trail ballot and an image of the accepted paper audit trail ballot if the voter accepts the printed paper audit trail ballot. Preferably, the audit trail scanner causes a rejected ballot image record including at least the image of the rejected paper audit trail ballot to be stored in a ballot image database if the voter rejects the printed paper audit trail ballot and an accepted ballot image record including at least the image of the accepted paper audit trail ballot to be stored in the ballot image database if the voter accepts the printed paper audit trail ballot. Each of the rejected ballot image record and the accepted ballot image record, if created, is preferably a digitally signed record generated by the audit trail scanner using a scanner cryptographic key and cryptographic engine provided with the scanner. Preferably, communications between the vote security device and the audit trail printer are digitally signed by the vote security device and the audit trail printer verifies the signature before printing the paper audit trail ballot. Alternatively, a secret key shared between the vote security device and the audit trail printer is used to encrypt communications from the vote security device, which are decrypted by the audit trail printer before printing the paper audit trail ballot. Similarly, communications from the audit trail scanner can be encrypted before being sent to the vote security device. The secret session keys used to protect the communications can be exchanged using a public key authenticated key exchange protocol.

In another particular embodiment, the audit trail scanner includes software for extracting information from images. In this embodiment, the audit trail scanner extracts voter selection information from the image of the accepted paper audit trail ballot if the voter accepts the printed paper audit trail ballot using the software and causes a scanned vote message including at least the voter selection information to be stored in a scanned vote database under the control of the vote security device. Preferably, the scanned vote message is a digitally signed message generated by the audit trail scanner. The vote security device verifies the signature on the scanned vote message before recording the scanned vote message in the scanned vote database. Alternatively, a secret key shared between the vote security device and the audit trail scanner encrypts communications from the audit trail scanner which are decrypted by the vote security device before recording the scanned vote message in the scanned vote database.

In still another embodiment, the vote security device causes the audit trail printer to print the rejection indicator by generating and sending to the audit trail printer an encrypted or digitally signed rejection command generated using one or more cryptographic keys and the cryptographic engine if the voter rejects the printed paper audit trail ballot, and the vote security device causes the audit trail printer to print the acceptance indicator by generating and sending to the audit trail printer an encrypted or digitally signed acceptance command generated using one or more cryptographic keys and the cryptographic engine if the voter accepts the printed paper audit trail ballot. In this embodiment, the audit trail printer includes a printer key storage for storing one or more printer cryptographic keys and a printer cryptographic engine. The audit trail printer will print the rejection indicator only if it is able to verify, i.e., decrypt and/or authenticate the digital signature of, the rejection command using the one or more printer cryptographic keys and the printer cryptographic engine, and the audit trail printer will print the acceptance indicator only if it is able to verify the acceptance command using the one or more printer cryptographic keys and the printer cryptographic engine. The cryptographic keys may be a private key of the vote security device and the printer cryptographic keys may a public key of the vote security device that corresponds to the private key.

In yet another embodiment, the voter is provided with a vote authorization token, such as, without limitation, a smart card, a magnetic stripe card, and RFID tag, or a card having a barcode printed thereon, that includes a vote authorization number. In this embodiment, the vote security device is adapted to determine whether the vote authorization number is fresh, and the ballot is presented on the user interface only if the vote security device determines that the vote authorization number is fresh.

According to another embodiment, the invention provides an electronic voting method in an electronic voting system including a vote security device having one or more cryptographic keys and a cryptographic engine for generating encrypted or digitally signed messages using one or more cryptographic keys, the method comprising electronically presenting a ballot to a voter, electronically receiving one or more selections on the ballot from the voter, and printing a paper audit trail ballot based on and indicating the one or more selections made on the ballot by the voter only in response to one or more messages received from the vote security device. The method further includes allowing the voter to view but not physically access the paper audit trail ballot, electronically receiving an acceptance or rejection of the printed paper audit trail ballot from the voter, printing, only in response to one or more second messages received from the vote security device, a rejection indicator on the printed paper audit trail ballot to create a rejected paper audit trail ballot if the rejection is received, and printing, only in response to one or more third messages received from the vote security device, an acceptance indicator on the printed paper audit trail ballot to create an accepted paper audit trail ballot if the acceptance is received. The method further includes generating a digitally signed vote database record that includes the selections made on the ballot by the voter and an indication as to whether the voter accepted or rejected the printed paper audit trail ballot, and storing the digitally signed vote database record. Furthermore, the method may implement the various alternate embodiments described above in connection with the electronic voting system.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
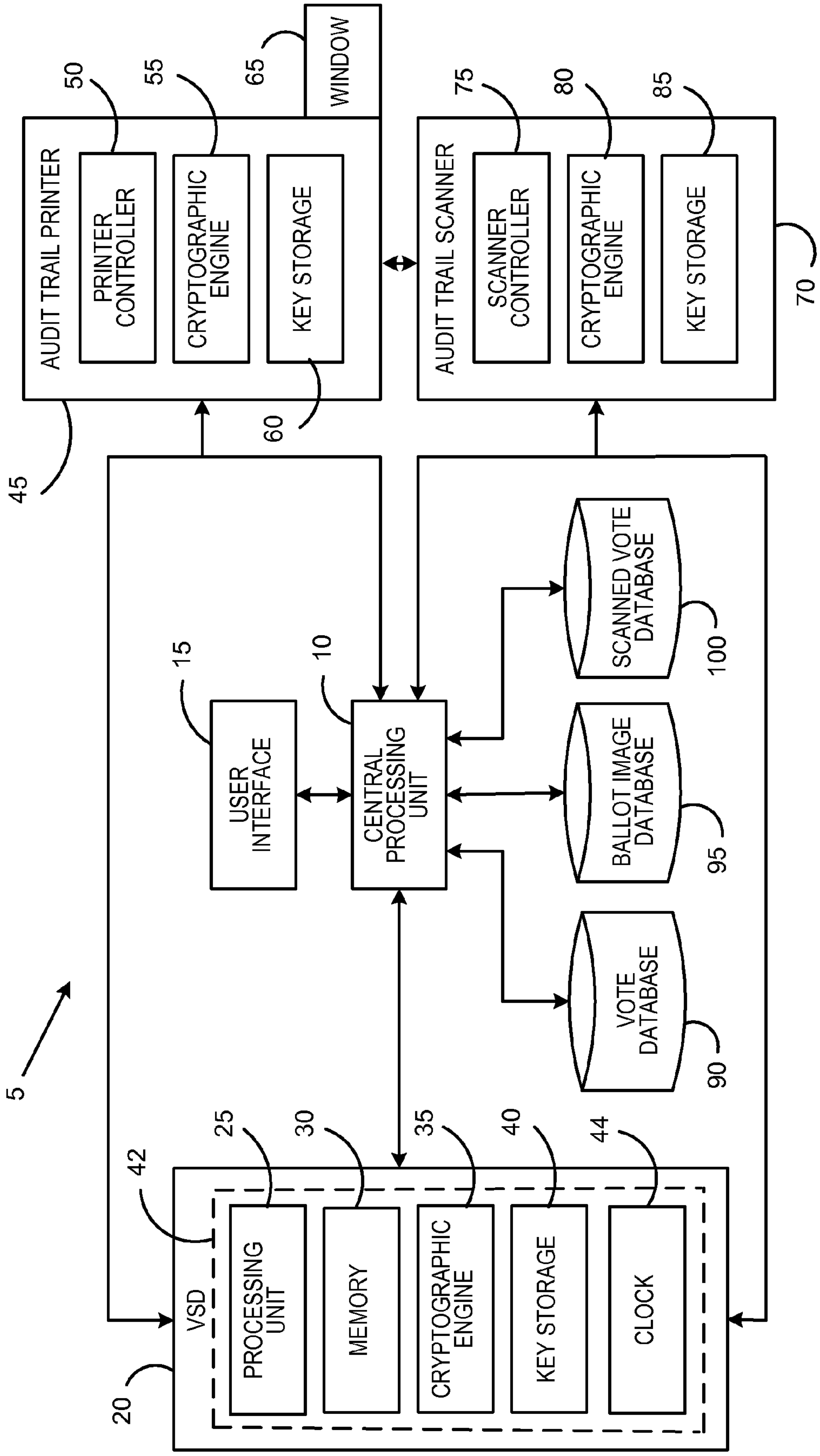
FIG. 1 is a block diagram of an electronic voting system according to one embodiment of the present invention.

FIG. 1 is a block diagram of an electronic voting system 5 according to one embodiment of the present invention. The electronic voting system 5 includes a central processing unit 10 which controls the overall operation of the electronic voting system 5. The central processing unit 10 may be, for example, a microprocessor, a microcontroller, or any other suitable processor. The electronic voting system 5 also includes a user interface 15 that is operatively coupled to the central processing unit 10. The user interface 15 preferably includes some type of a display device, such as an LCD, and some type of an input device, such as a keyboard or a touch screen. The user interface 15 is provided in order to allow voters to interact with the electronic voting system 5, and in particular to input information into the electronic voting system 5 and receive information output by the electronic voting system 5 as described more fully elsewhere herein.

The electronic voting system 5 further includes a vote security device (VSD) 20 for securing communications and transactions between the various components of the electronic voting system 5 as described herein. As seen in FIG. 1, the VSD 20 includes a processing unit 25 for controlling the operation of the VSD 20, and in particular for ensuring that transactions follow the security policies established for the VSD 20. The VSD 20 also includes a memory 30 for accounting for votes that are cast using the electronic voting system 5, and may include vote totals for each possible selection (i.e., candidate) in the election. A cryptographic engine 35 is provided as part of the VSD 20 for authenticating messages both from within the electronic voting system 5 and from outside of the electronic voting system 5, and for encrypting or digitally signing records and messages as described herein using cryptographic keys that are stored in the key storage 40 provided as part of the VSD 20. Preferably, the VSD 20 is a FIPS 140-2 level 3 device, although other suitable security level devices may also be employed. The VSD 20 preferably includes a physical cryptographic boundary (designated by dashed line 42) that protects the VSD 20 against tampering. Devices suitable for such physical cryptographic boundaries can include, for example, switches that detect opening or removal of part of a case, sensors that detect changes in environmental conditions such as temperature or electrical noise, or a wire grid device that protects against tampering. Separating the VSD 20 from other parts of the electronic voting system 5 has the advantage that no undetectable changes can be made to the databases (described below) without the use of the VSD 20. As the VSD 20 has limited functionality, it may be implemented as a finite state machine, thus providing high assurance that records signed by the VSD 20 have not been modified. The VSD may also optionally include a real time clock 44. When the system 5 is initialized for a particular election, the initialization information can include a start and stop time for the election. The VSD 20 can be programmed to not accept any votes for the election outside of those times.

The electronic voting system 5 further includes a secure audit trail printer 45 that is operatively coupled to the VSD 20 and the central processing unit 10 and that prints only on commands originating from the VSD 20. The audit trail printer 45 has a print controller 50 for controlling the operation thereof, and a cryptographic engine 55 and key storage 60 for verifying messages received from the VSD 20. The audit trail printer 45 further includes a window 65 that allows paper audit trail ballots as described elsewhere herein that are printed by the audit trail printer 45 to be viewed by but not physically accessible to voters.

The electronic voting system 5 further includes a secure audit trail scanner 70 that is operatively coupled to the VSD 20 and the central processing unit 10 (and preferably the audit trail printer 45) for scanning the paper audit trail ballots created by the audit trail printer 45 as described elsewhere herein in order to generate images thereof. The audit trail scanner 70 includes a scanner controller 75 for controlling the operation thereof, and a cryptographic engine 80 and key storage 85 for verifying messages received from the VSD 20 and/or for creating digitally signed records as described elsewhere herein. In one particular embodiment, the audit trail scanner 70 includes software that is capable of interpreting the images of the paper audit trial ballots that are created in order to determine the selections that have been made thereon and that is capable of creating a digitally signed records of the information that is interpreted thereby.

The electronic voting system 5 further includes a vote database 90, a ballot image database 95, and a scanned vote database 100. The function of each of these databases is described in more detail elsewhere herein.

Figure 2A:
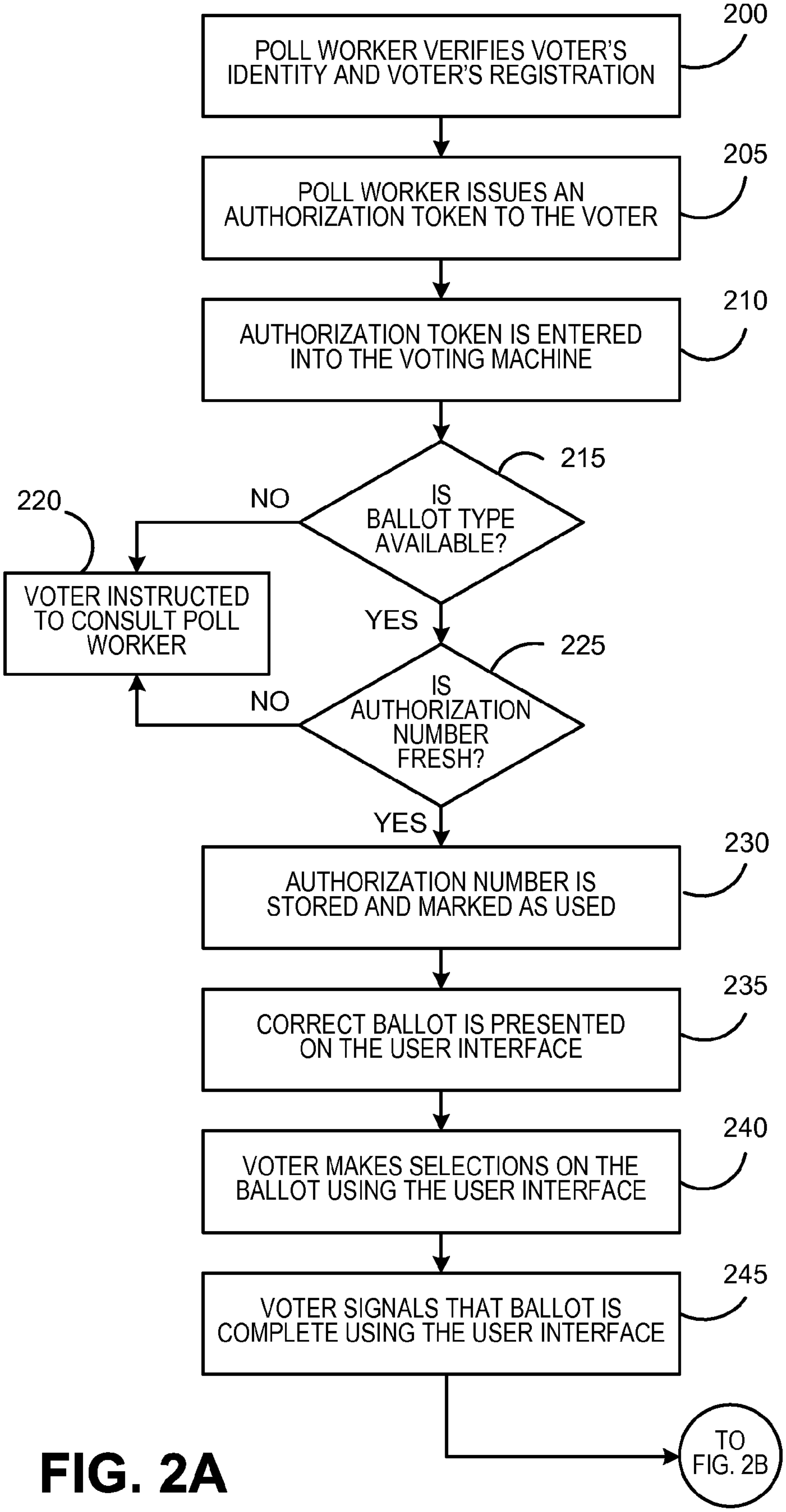
FIGS. 2A and 2B are a flowchart illustrating a method of operating the electronic voting system of FIG. 1.
Figure 2B:
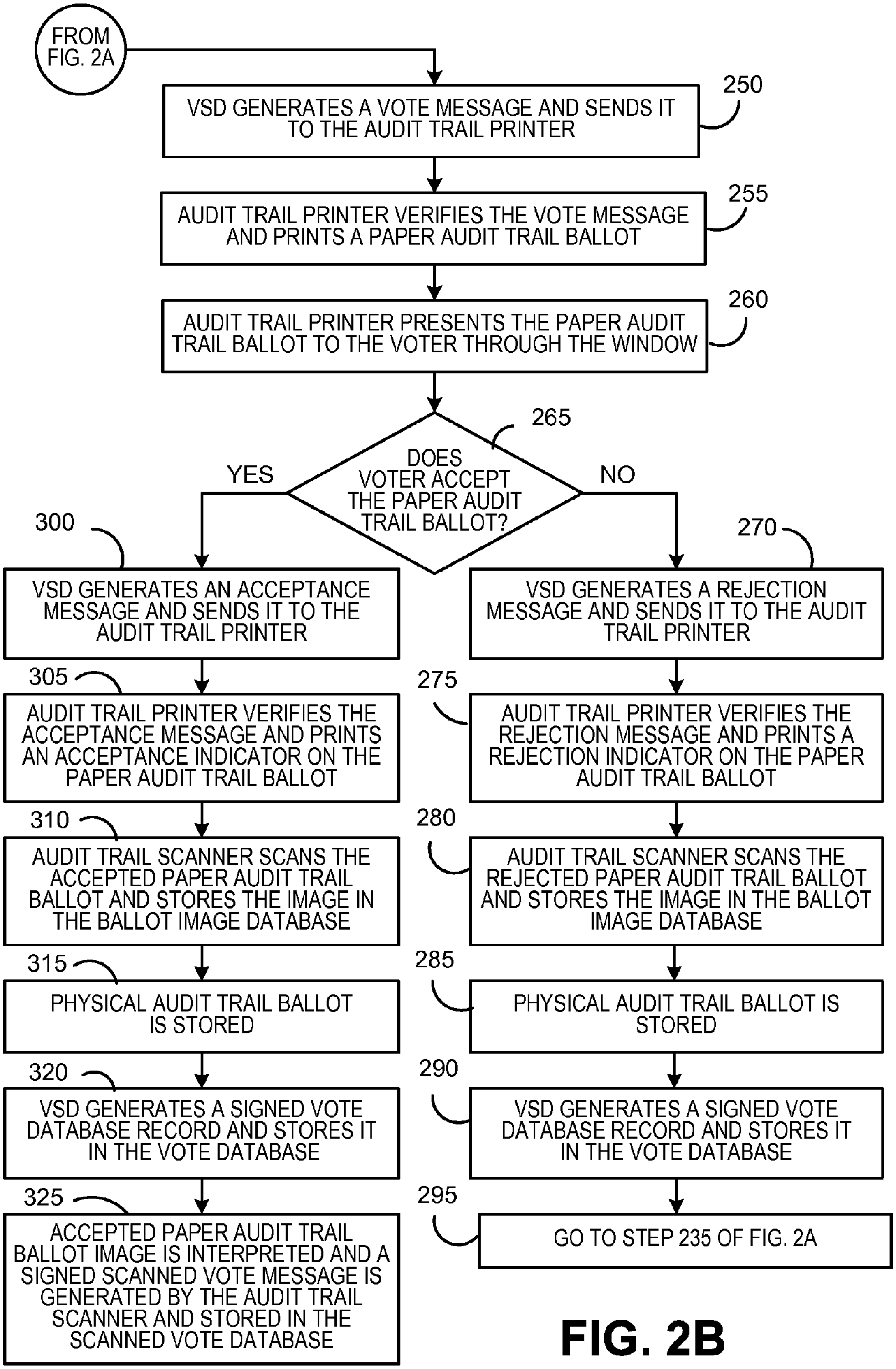

FIGS. 2A and 2B are a flowchart illustrating a method of operating the electronic voting system 5 in an election according to an embodiment of the invention. The embodiment of the invention contemplates that the electronic voting system 5 will be located at a polling location for the election that is staffed by one or more authorized poll workers. In addition, the method shown in FIGS. 2A and 2B is presented from the perspective of a single voter, but as will be appreciated, the method will be repeated for each voter that is voting in the election using the electronic voting system 5. The method begins at step 200, wherein a poll worker verifies the voter's identity and voter registration at the polling location. This step can be by presentation of a picture ID such as a driver's license or a voter identification card mailed to the voter. The poll worker verifies that the person presenting themselves as a voter matches the identification that was presented and is registered to vote in the election. Next, once the poll worker is satisfied with the voter's right to vote in the election, the poll worker, at step 205, provides the voter with an authorization token which authorizes a vote on the electronic voting system 5 using a particular ballot (i.e., the ballot that lists the appropriate selections for the election in which the voter is authorized to vote). The authorization token is preferably a mechanism, such as, without limitation, a smartcard, a magnetic-stripe card, an RFID tag, or a card with a barcode printed thereon, that holds two items of information: (1) a unique vote authorization number, and (2) a ballot identifier. In particular, the authorization token holds this information in a manner that allows it to be read automatically by the electronic voting system 5. Next, at step 210, the authorization token is entered into the electronic voting system 5 either by the voter himself or herself, or preferably by a poll worker managing the electronic voting system 5. Preferably, the authorization token is entered by automatically reading the information from the authorization token using a suitable device provided as part of the electronic voting system 5 (e.g., as part of the user interface 15). For example, the electronic voting system 5 may be provided with a smartcard reader, an magnetic-stripe reader, an RFID reader, or a barcode reader as appropriate for this purpose. Then, at step 215, a determination is made, preferably by the central processing unit 10, as to whether the ballot type that is indicated by the ballot identifier on the authorization token is available through the electronic voting system 5. If the answer at step 215 is no, then a problem exists and the voter is instructed to consult an authorized poll worker at step 220 for assistance. If, however, the answer at step 215 is yes, then, at step 225, a determination is made, again preferably by the central processing unit 10, as to whether the authorization number provided on the authorization token is fresh, meaning that it has not been previously used in this election. For this purpose, used unique vote authorization numbers may be stored and tracked by the electronic voting system 5 or by a device separate from and in communication with the electronic voting system 5 for comparison to the vote authorization number obtained in step 210. If the answer at step 225 is no, meaning that the vote authorization number is not fresh as indicated by this comparison, then the method returns to step 220 wherein the voter is instructed to consult an authorized poll worker for assistance. However, if the answer at step 225 is yes, meaning that the vote authorization number is fresh, then the method proceeds to step 230, wherein the authorization number obtained from the authorization token is stored, as described above, and marked as a used authorization number for later freshness verification.

At step 235, a correct ballot, as indicated by the ballot identifier included in the authorization token obtained in step 210, is presented to the user through the user interface 15. Preferably, the ballot is displayed on a display, such as an LCD, provided as part of the user interface 15. Next, at step 240, the voter makes his or her selections on the ballot using the user interface 15 by, for example, indicating a selection using a keyboard or touchscreen provided as part of the user interface 15. At step 245, the voter, through the user interface 15, signals that the ballot is complete after all of his or her selections have been entered. At step 250, in response to the vote completion indication provided by the voter in step 245, the VSD 20 generates an encrypted and/or signed vote message and sends the vote message to the audit trail printer 45. The vote message includes the vote selections that were made by the voter in step 240 and, if provided, a digital signature of those vote selections that is created by the cryptographic engine 35 of the VSD 20 using the private key of the VSD 20 that is stored in the key storage 40. At the same time, the VSD 20 sends a command to the audit trail printer 45 to print a paper audit trail ballot as described below. At step 255, upon receiving that command and the vote message from the VSD 20, the audit trail printer 45 verifies the vote message, i.e., decrypts and/or authenticates the digital signature and, if the verification is successful, prints a paper audit trail ballot that indicates thereon the selections made by the voter. As will be appreciated, the audit trail printer, through the cryptographic engine 55, verifies the vote message using the digital signature of the signed vote message (if digitally signed) and the public key of the VSD 20 that is stored in the key storage 60 of the audit trail printer. Next at step 260, the audit trail printer 45 presents the paper audit trail ballot to the voter through the window 65. In this manner, the voter is able to view the paper audit trail ballot through the window 65 but does not have physical access to the paper audit trail ballot. The paper audit trail ballot may include fragile and robust watermarks. As will be appreciated by those of skill in the art, the use of a robust watermark provides evidence that this particular electronic voting system 5 produced the paper audit trail ballot on this particular day, and the use of a fragile watermark provides evidence that the paper audit trail ballot is not a copy.

Figure 4A:
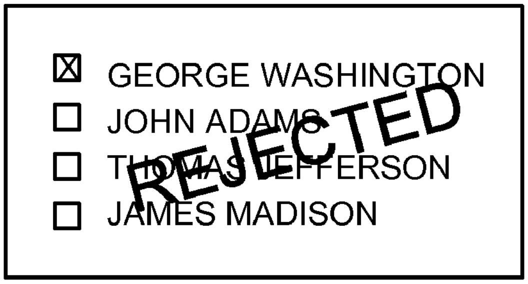
FIGS. 4A and 4B are schematic representations of a rejected paper audit trail ballot and an accepted paper audit trail ballot, respectively, that may be employed in the present invention.

Next, the voter decides whether the paper audit trail ballot is correct. In particular, at step 265, a determination is made as to whether the voter accepts the paper audit trail ballot as presented in step 260. Preferably, the voter does so through the user interface 15 by, for example, pressing an accept or reject button as appropriate. If the answer at step 265 is no, meaning that the voter has rejected the paper audit trail ballot, then, at step 270, the VSD 20 generates an encrypted and/or signed rejection message and sends it to the audit trail printer. The rejection message includes a command to print a rejection indicator on the ballot and, if digitally signed, a digital signature of that command created through the cryptographic engine 35 using the private key of the VSD 20 from the key storage 40. At step 275, the audit trail printer 45 verifies, i.e., decrypts and/or authenticates the digital signature, the rejection message through the cryptographic engine 55 using the public key of the VSD 20 that is stored in the key storage 60. If the audit trail printer is able to successfully verify the rejection message, the audit trail printer then prints a rejection indicator on the paper audit trail ballot which clearly indicates that that paper audit trail ballot has been rejected by the voter. For example, the rejected paper audit trail ballot may appear as shown in FIG. 4A.

Next, at step 280, the audit trail scanner 70 scans the rejected paper audit trail ballot to create an image thereof and causes that image to be stored in the ballot image database 95. To accomplish this, the audit trail scanner 70 may be operatively coupled to the audit trail printer 45 so that the scanning may be performed automatically without the need for manual intervention (i.e., feeding of the paper audit trail ballot into the audit trail scanner 70). While this is preferred, it should be appreciated that a manual method may also be employed. Following step 280, the physical audit trail ballot that has been rejected is stored in a secure storage area under the control of the voting authority that is running the election. Then, at step 290, the VSD 20 generates a digitally signed vote database record for the rejected paper audit trail ballot and stores that record in the vote database 90. In the preferred embodiment, the signed vote database record is of the form shown in FIG. 3 and includes a field for identifying the ballot type, a field for identifying the vote authorization number and an indication that the electronic voting system 5 authenticated and marked as used the vote authorization number, a field for identifying the voter selections that were indicated on that ballot, a field for identifying whether the particular ballot was accepted or rejected (step 265), a field that includes an identifier for identifying that particular record, and a digital signature of the just described information created using the cryptographic engine 35 of the VSD 20 and the private key of the VSD 20 stored in the key storage 40. Next, at step 295, the method returns to step 235 of FIG. 2A in order to give the voter another opportunity to cast his or her votes. In one embodiment, the voter may be presented with a fresh ballot on the user interface 15, or alternatively, may be given the opportunity to modify the previously presented ballot to enter a new vote. In addition, there may be, in one particular embodiment, a counter that records and limits the number of rejected ballots that a voter is entitled to before requiring the voter to pursue an alternate method of voting.

Figure 4B:
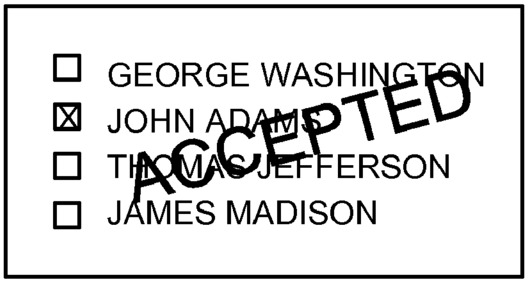

Returning to step 265, if the answer is yes, meaning that the voter has accepted the paper audit trail ballot, then the method proceeds to step 300. At step 300, the VSD 20 generates an encrypted and/or digitally signed acceptance message and sends the acceptance message to the audit trail printer 45. The acceptance message includes a command to print an acceptance indicator on the paper audit trail ballot and, if provided, a digital signature thereof created using the cryptographic engine 35 and the private key of the VSD 20 stored in the key storage 40. Next, at step 305, the audit trail printer 45 verifies, i.e., decrypts and/or authenticates the digital signature, the acceptance message using the cryptographic engine 55 and the public key of the VSD 20 stored in the key storage 60. If the acceptance message is able to be verified, the audit trail printer 45 then prints an acceptance indicator on the paper audit trail ballot as shown in, for example, FIG. 4B. Next, at step 310, the audit trail scanner scans the accepted paper audit trail ballot to create an image thereof and causes the image to be stored in the ballot image database 95. Then, at step 315, the physical accepted paper audit trail ballot is stored in a secure location which may be separate from or the same as the location in which the physical rejected paper audit trail ballots are stored (step 285).

Figure 3:
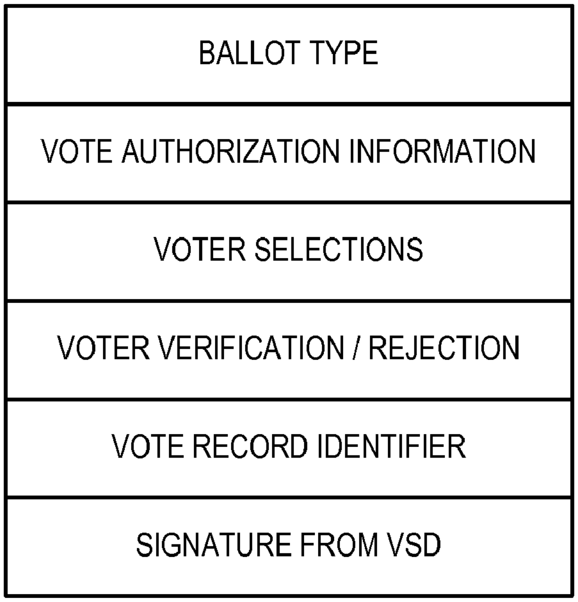
FIG. 3 is a schematic representation of a signed vote database record that may be employed in the present invention.

At step 320, the VSD 20 then generates a digitally signed vote database record preferably in the form shown in FIG. 3 for the accepted paper audit trail ballot and stores that signed vote database record in the vote database 90. Next, at step 325, the audit trail scanner interprets (for example using optical character recognition (OCR) software) the accepted paper audit trail ballot image in order to determine the selections that are indicated thereon. Once that interpretation occurs, the audit trail scanner 70 generates a digitally signed scanned vote message and causes that signed scanned vote message to be stored in the scanned vote database 100. Preferably, the signed scanned vote message includes the selections that were obtained through interpretation from the scanned image of the accepted paper audit trail ballot and a digital signature thereof that is created by the cryptographic engine 80 using the private key of the audit trail scanner 70 that is stored in the key storage 85. Because vote data is stored in both the vote database 90 and the scanned vote database 100, the VSD 20 can compare the vote database records stored in the vote database 90 to the records stored in the scanned vote database 100 to verify that those votes are consistent. This verification may be done during the election, or preferably, during a recount process following the election. In addition, during the election, the memory 30 of the VSD 20 may track and total the votes that are cast for each possible selection (i.e., candidate) in the election securely in the memory 30. Other information may also be included in the memory 30, including, for example, the total number of ballots cast, the number of different types of exceptions, and the number of no-vote-cast votes for each position. Other additive variables such as linear error control codes, such as described in U.S. Pat. No. 7,092,930, can also be included.

Following step 325 (i.e., upon completion of an accepted ballot and storage of the information therein), a publicly visible or audible signal may be provided that indicates that the voter's voting is complete and that his or her ballot has been entered. Such a signal is similar to the bell that typically rings when the lever or levers on a traditional mechanical voting machine are slid in order to record the voter's vote.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. An electronic voting system, comprising:

a central processing unit to control operation of the voting system;

a vote security device separate from the central processing unit and operatively coupled to the central processing unit, the vote security device having a processing unit, a key storage for storing a cryptographic key, and a cryptographic engine for generating encrypted and/or digitally signed messages using said cryptographic key for sending to the central processing unit;

a security device that provides a cryptographic boundary for the vote security device, the central processing unit being outside of the cryptographic boundary, the security device being operable to detect tampering with the vote security device;

a user interface coupled to the central processing unit for presenting a ballot to a voter and for enabling said voter to make one or more selections on said ballot;

an audit trail printer operatively coupled to said vote security device and said central processing unit, said audit trail printer printing a paper audit trail ballot only in response to one or more of said messages generated using said cryptographic key received from said vote security device, said paper audit trail ballot being based on and indicating the one or more selections made on said ballot by said voter, said audit trail printer being structured to allow said voter to view but not physically access said paper audit trail ballot, said printed paper audit trail ballot being accepted or rejected by said voter via said user interface, said vote security device causing said audit trail printer to print a rejection indicator on the printed paper audit trail ballot to create a rejected paper audit trail ballot if said voter rejects the printed paper audit trail ballot, said vote security device causing said audit trail printer to print an acceptance indicator on the printed paper audit trail ballot to create an accepted paper audit trail ballot if said voter accepts the printed paper audit trail ballot; and a vote database operatively coupled to said vote security device via said central processing unit, said vote security device causing a vote database record to be stored in said vote database that includes at least the one or more selections made on said ballot by said voter and an indication as to whether said voter accepted or rejected the printed paper audit trail ballot, said vote database record including a digital signature generated by said vote security device using said cryptographic key and said cryptographic engine.

2. The electronic voting system according to claim 1, further comprising an audit trail scanner, said audit trail scanner generating an image of said rejected paper audit trail ballot if said voter rejects the printed paper audit trail ballot and an image of said accepted paper audit trail ballot if said voter accepts the printed paper audit trail ballot.

3. The electronic voting system according to claim 2, further comprising a ballot image database, wherein said audit trail scanner causes a rejected ballot image record including at least said image of said rejected paper audit trail ballot to be stored in said ballot image database if said voter rejects the printed paper audit trail ballot and an accepted ballot image record including at least said image of said accepted paper audit trail ballot to be stored in said ballot image database if said voter accepts the printed paper audit trail ballot.

4. The electronic voting system according to claim 3, wherein said audit trail scanner includes a scanner key storage for storing a cryptographic key and a scanner cryptographic engine, wherein each of said rejected ballot image record and said accepted ballot image record, if created, is a digitally signed record generated by said audit trail scanner using said scanner cryptographic key and said scanner cryptographic engine.

5. The electronic voting system according to claim 2, further comprising a scanned vote database, wherein said audit trail scanner includes software for extracting information from images, and wherein said audit trail scanner extracts voter selection information from said image of said accepted paper audit trail ballot if said voter accepts the printed paper audit trail ballot using said software and causes a scanned vote message including at least said voter selection information to be stored in said scanned vote database.

6. The electronic voting system according to claim 5, wherein said audit trail scanner includes a scanner key storage for storing a scanner cryptographic key and a scanner cryptographic engine, wherein said scanned vote message is a digitally signed message generated by said audit trail scanner using said scanner cryptographic key and said scanner cryptographic engine.

7. The electronic voting system according to claim 1, wherein said audit trail printer includes a printer key storage for storing a printer cryptographic key and a printer cryptographic engine for verifying said encrypted and/or digitally signed messages.

8. The electronic voting system according to claim 1, wherein said voter is provided with a vote authorization token that includes a vote authorization number, wherein said vote security device is adapted to determine whether said vote authorization number is fresh, and wherein said ballot is presented on said user interface only if said vote security device determines that said vote authorization number is fresh.

* * * * *